United States Patent [19]
Hara et al.

[11] Patent Number: 6,056,197
[45] Date of Patent: May 2, 2000

[54] INFORMATION RECORDING METHOD FOR PREVENTING ALTERATION, INFORMATION RECORDING APPARATUS, AND INFORMATION RECORDING MEDIUM

[75] Inventors: Hiroshi Hara, Kawasaki; Hideki Hosoya, Yokohama, both of Japan

[73] Assignee: Canon Kabushiki Kaisha, Tokyo, Japan

[21] Appl. No.: 09/025,035

[22] Filed: Feb. 18, 1998

[30] Foreign Application Priority Data

Feb. 19, 1997 [JP] Japan .................................. 9-034810
Feb. 17, 1998 [JP] Japan ................................ 10-034724

[51] Int. Cl.$^7$ .................................................. G06K 7/10
[52] U.S. Cl. .......................................... 235/454; 235/380
[58] Field of Search ............................. 369/275.3, 234; 235/454, 455, 494, 493, 492, 380, 379, 375

[56] References Cited

U.S. PATENT DOCUMENTS

| | | | |
|---|---|---|---|
| 4,912,694 | 3/1990 | Yamamoto | 369/59 |
| 5,233,598 | 8/1993 | Hoshi et al. | 369/275.3 |
| 5,408,456 | 4/1995 | Hosoya | 369/59 |
| 5,461,719 | 10/1995 | Hosoya | 395/439 |
| 5,506,397 | 4/1996 | Hoshino | 235/492 |
| 5,581,630 | 12/1996 | Bonneau, Jr. | 382/116 |
| 5,638,345 | 6/1997 | Hosoya | 369/32 |

FOREIGN PATENT DOCUMENTS

| | | |
|---|---|---|
| 62-077959 | 4/1987 | Japan . |
| 63-091888 | 4/1988 | Japan . |
| 63-244385 | 10/1988 | Japan . |

*Primary Examiner*—Thien M. Le
*Attorney, Agent, or Firm*—Fitzpatrick, Cella, Harper & Scinto

[57] ABSTRACT

Information is recorded on an information recording medium including a partition. Predetermined information is recorded on at least the partition of the recording medium, and it is confirmed whether the predetermined information has been normally recorded. When the predetermined information is not normally recorded, rerecording is executed. After the predetermined information is normally recorded, dummy data is recorded on a remaining region other than on a region in which the predetermined information has been recorded, so as to eliminate an unoccupied region in the partition. Recording dummy data eliminates a vacant region of the partition. The dummy data can be a specific character train, a periodic repetition of data, a specific character, or continuation of data.

16 Claims, 5 Drawing Sheets

INFORMATION RECORDING METHOD FOR PREVENTING ALTERATION, INFORMATION RECORDING APPARATUS, AND INFORMATION RECORDING MEDIUM

BACKGROUND OF THE INVENTION

1. Field of the Invention

The invention relates to an information recording method for recording information to an information recording medium, an information recording apparatus, and an information recording medium. More particularly, the invention relates to the prevention of alteration of recording information on an information recording medium.

2. Related Background Art

Hitherto, various types of an information recording medium for magnetically or optically recording and reproducing information, such as disk-shape, card-shape, tape-shape, and the like, have been known. As such recording media, there are various kinds of media such as read only medium, recordable but unerasable medium, and recordable and erasable medium. Among those recording media, a card-shaped recording medium, particularly, a recording medium for optically recording and reproducing information by using a semiconductor laser (hereinafter, such a medium is referred to as an optical card) is small and light-weight, and is convenient for carrying, and has a relatively large storage or recording capacity. Therefore, a large demand is expected for recording medical information and personal information on this type of medium.

FIG. 1 is a plan view showing an example of such an optical card. FIG. 2 is a cross sectional view taken along the line 2—2 in FIG. 1. In the diagrams, reference numeral 5 denotes an optical card having a card shape. An information recording region 21 is provided on almost the whole surface of the optical card 5 and margin regions 22 are provided in partial regions in the upper and lower portions. A plurality of tracks 19 for tracking are preformatted in parallel at regular intervals in the information recording region 21 in order to perform an auto tracking. An information track 20 to record and reproduce information is provided between the tracks 19 for tracking. Track numbers 18 are used to discriminate each information track 20 and are preformatted at both ends of each information track 20.

As shown in FIG. 2, the optical card 5 is made up of a plurality of layers. A recording layer 24 is joined onto a substrate 26 by an adhesive agent layer 25. Further, a transparent protecting layer 23 is formed on the recording layer 24. The protecting layer 23 and recording layer 24 are formed so as to come into contact with each other by recess and projection shapes. With such a structure, the recording layer 24 is divided into the information tracks and the tracks for tracking. That is, a recess portion of the recording layer 24 corresponds to the information track 20 and a projection portion corresponds to the track 19 for tracking. As a recording layer 24, for example, a material such as silver salt system, dye system, chalcogen system, or the like is used.

To record information to such an optical card 5, a light beam of a semiconductor laser is converged to a micro light spot, the light spot is modulated in accordance with recording information to be recorded, and the modulated light spot is scanned onto the information track, so that the information is recorded onto the optical card 5 as an information pit train which can be optically detected. Since the information pit train is recorded by a physical change such as deformation, color change, or the like by light or heat, it is impossible to physically erase the information pit train which has once been recorded and to again use the region of the erased information pit train as a recording region. To reproduce the information pit train recorded on the optical card 5, a light beam of a predetermined intensity and of a certain degree such that recording cannot be performed is scanned on the information pit train. The reflected light (or transmitted light) from the optical card 5 at that time is detected by a photosensor, and a predetermined signal process such as binarization, demodulation, or the like is executed by using the derived detection signal, so that the recorded information is reproduced.

A file management for a system for recording and reproducing information by using an optical card will now be described. First, in a case of recording a certain amount of information onto the optical card, the information is recorded as a data file and information to manage the data file (hereinbelow, such information is referred to as a directory) is recorded in addition to the data file. Ordinarily, by separately recording the data file and the directory into the information recording region 21 in FIG. 1, file management can be easily performed. In a case of recording information, by recognizing recording start positions of the data file and the directory with reference to the directory of the relevant file, the data and the directory are recorded subsequent to the data and directory which were finally recorded, respectively.

At present, a method of using one optical card such as a medical card, bank card, or the like for a plurality of purposes by making the most of the characteristics such that the capacity is relatively large is considered as a using method of the optical card. That is, the optical card is used as a medical card to record personal medical data and the same optical card is used as a bank card in a bank or the like, thereby improving convenience. To use the optical card for multi purposes as mentioned above, therefore, as disclosed in, for example, JP-A-62-77959 (Laid-open No. 63-244385), there is known an information recording and reproducing method whereby a recording region of one optical card is divided into a plurality of blocks (partitions) and data and a directory are recorded to the respective partitions and each partition is used as one optical card.

In a case of using one optical card as a plurality of optical cards, from a viewpoint of protection of personal privacy, key information (hereinbelow, referred to as password information) to permit the recording and reproduction of information in every partition of the optical card is recorded so as to make it impossible to record and reproduce the information from an application (for example, application for a bank card) using one certain partition into a partition which is used by another application (for instance, application for a hospital card). There is used a method whereby in a case of recording and reproducing information to any one of the partitions, the password information corresponding to the partition is inputted, the inputted password information is collated with the password information recorded in the relevant partition, and only when both of the password information coincide, the recording and reproduction are permitted to the target partition.

The password information is recorded into a specific region of the partition. The apparatus or application manages the password information, thereby assuring security of the information of each partition. A method whereby information (for example, personal information or the like) which is commonly used for a plurality of applications is recorded in an area in a partition at one position and a plurality of applications access the partition by using the common password, thereby a method for efficiently using the memory capacity of the optical card is also known. Although the above description has been made with respect to the case where a plurality of applications use one optical card, even in a case where one application uses one optical card, there is also a case where the recording region of an optical card is similarly divided into a plurality of partitions.

Since the optical card as mentioned above is usually a WORM type recording medium, it is impossible to physically erase and rewrite the information once it has been recorded. Therefore, in such a WORM type recording medium, in a case of erasing recorded information, for example, as disclosed in JP-A-61-237033 (Laid-open No. 63-91888), there is used a method of logically erasing the information by recording information indicating that the information was erased to the information which has already been recorded. By using this method, after the information which had already been recorded was logically erased, by after-recording new information, an updating process of a file can be logically executed.

However, according to the method of logically updating the file by newly after-recording information to the recording medium, when contrarily considering, the important information on the recording medium can be simply altered by after-recording information. Therefore, to prevent such an information alteration, it is considered that a region to record specific important information or a partition is set to the minimum size that is necessary to record the specific important information.

However, if the size of partition is preset to the minimum size that is necessary to record information, when a recording error occurs, a problem would arise such that all of the information cannot be recorded because of the preset, minimum-sized recording region. As causes of the recording error, there are defects such as scratches or dust on the recording medium, and also causes which cannot be predicted such as a vibration which is applied from the outside upon recording or the like. It is, therefore, difficult to predict an amount of recording errors and to set the partition to the size that is necessary for recording information in consideration of the amount of recording errors. If the size of a partition is set to a sufficiently large size, there is a fear such that the information on the optical card is altered as mentioned above.

As mentioned above, hitherto, there is still room for alteration of the recorded important information by newly after-recording information into an unrecording region of the optical card. Particularly, such alteration is a fatal problem when the recorded information is information to confirm the user himself or information regarding a money process, for example.

SUMMARY OF THE INVENTION

It is an object of the invention to provide an information recording method, an information recording apparatus, and an information recording medium in which alteration of information can be certainly prevented in consideration of the above conventional problems.

The above object of the invention may be accomplished by an information recording method of recording information to an information recording medium including at least a single partition, comprising the steps of: recording predetermined information on at least the one partition of the recording medium; confirming whether the predetermined information has normally been recorded or not; rerecording when the information is not normally recorded; and recording dummy data onto a remaining region of the partition so as to eliminate an unoccupied region in the partition after the predetermined information was normally recorded.

There is also provided an information recording apparatus for recording information on an information recording medium including at least a single partition, comprising: means for recording predetermined information on at least the one partition in the recording medium; and means for confirming whether the predetermined information has normally been recorded or not, wherein when the predetermined information is not normally recorded, a rerecording is performed and after the predetermined information was normally recorded, dummy data to eliminate an unoccupied region in the partition is recorded into a remaining region in the partition by the recording means.

There is also provided an information recording medium including two or more partitions, comprising: a security information recorded on at least one of the partitions; and dummy data recorded on a remaining region of the partitions excluding the security information.

The above and other objects and features of the present invention will become apparent from the following detailed description and the appended claims with reference to the accompanying drawings.

DETAILED DESCRIPTION OF THE PREFERRED EMBODIMENTS

Figure 3:
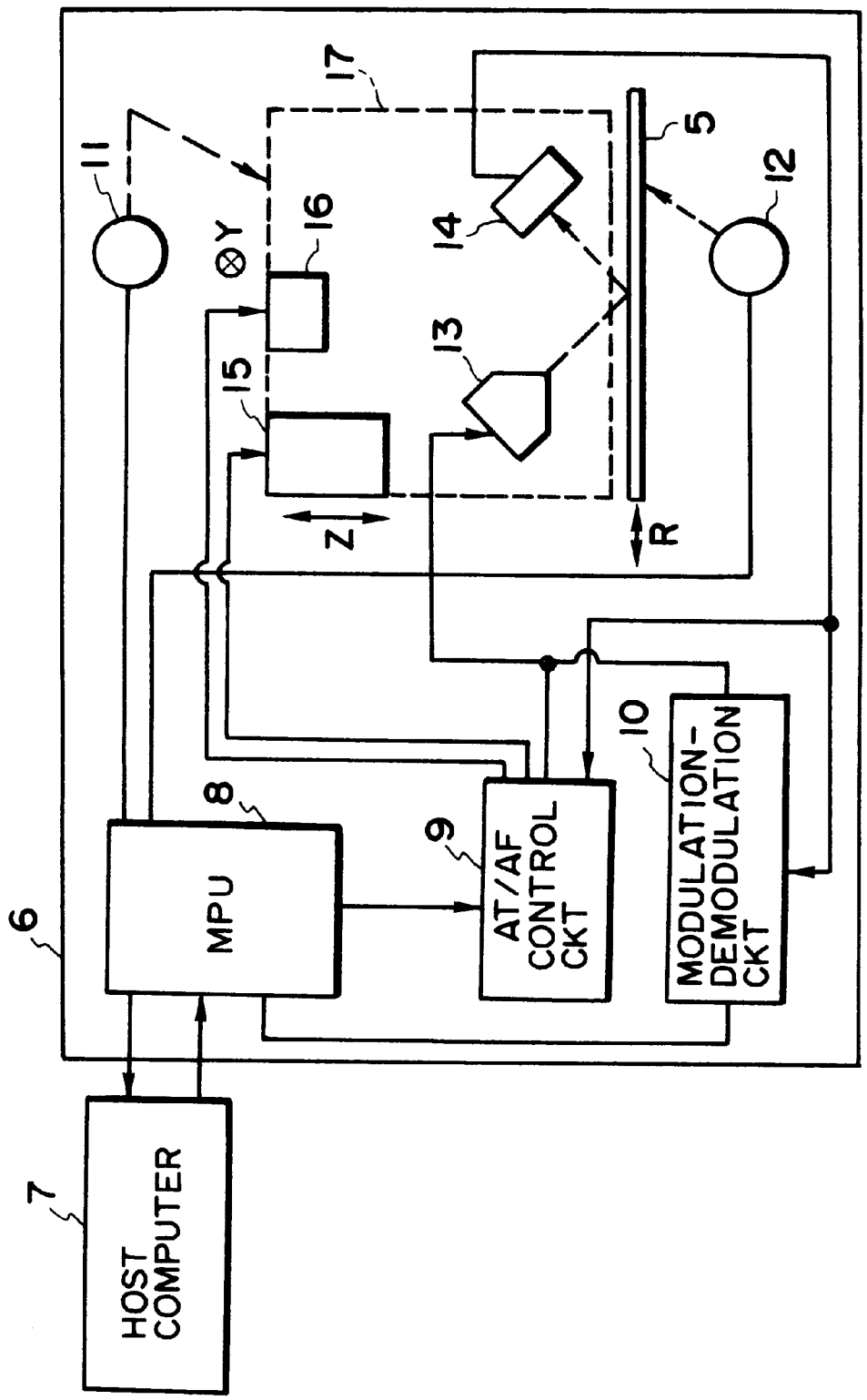
FIG. 3 is a block diagram showing a constructional example of an information recording apparatus according to the invention.

An embodiment of the present invention will now be described in detail hereinbelow with reference to the drawings. FIG. 3 shows a construction of an embodiment of an information recording and reproducing apparatus according to the invention. In FIG. 3, reference numeral 6 denotes an information recording and reproducing apparatus (hereinafter, referred to as a drive) and 7 indicates a host computer serving as an upper control apparatus. The drive 6 is connected to the host computer 7 through an interface (not shown) and records information to an information recording medium or reproduces the recorded information by a command from the host computer 7. The optical card 5 as mentioned above is used as an information recording medium.

An MPU (microprocessor circuit) 8 having therein an ROM and an RAM is provided in the drive 6. The MPU 8 executes transmission and reception of data to/from the host computer 7 and controls each section such as head feed motor 11, card feed motor 12, AT/AF control circuit 9, and the like in the drive 6, thereby controlling the recording and reproducing operations of the information for the optical card 5. As will be explained in detail hereinafter, after fingerprint information is recorded to one partition of the optical card 5, the MPU 8 executes a control for determining whether there is an unrecording region in the partition or not and recording dummy data to prevent alteration of data onto the unrecording region of the partition.

The card feed motor 12 is a motor for driving a conveying mechanism (not shown), guiding the optical card 5 to a predetermined position in the apparatus, reciprocating and moving the optical card 5 in an R direction at the predetermined position, and further ejecting the optical card 5 to the outside of the apparatus on the basis of the control of the MPU 8. A light beam irradiation optical system 13 includes an optical system such a semiconductor laser of a light source, objective lens to converge a light beam from the light source, and the like, converges the light beam from the light source to a micro light spot upon recording or reproduction of information, and irradiates the optical card 5 with a micro light spot. A photodetector 14 is a sensor to detect the reflected light from the optical card 5. An AF actuator 15 is a focusing actuator to move a focal position of the light spot on the optical card surface in a Z direction by driving a part of the light beam irradiation optical system 13. An AT actuator 16 is a tracking actuator to move the light spot on the optical card surface in a Y direction by driving a part of the light beam irradiation optical system 13.

An optical head 17 is constructed by including the light beam irradiation optical system 13, photodetector 14, AF actuator 15, and AT actuator 16. The head feed motor 11 is a motor for moving the optical head 17 in the Y direction on the basis of the control of the MPU 8 and accessing the light spot from the light beam irradiation optical system 13 to a desired track. The AT/AF control circuit 9 drives the AF actuator 15 and AT actuator 16 on the basis of an output signal from the photodetector 14 and executes auto-focusing control and auto-tracking control so that the light spot from the light beam irradiation optical system 13 is focused onto the card surface and the light spot scans an information track while tracing it.

A modulation-demodulation circuit 10 is a circuit for modulating recording information and demodulating reproduction information on the basis of the control of the MPU 8. Upon recording of information, the recording information transferred from the host computer 7 is modulated by the modulation-demodulation circuit 10 and the light source of the light beam irradiation optical system 13 is driven in accordance with a modulation signal, thereby recording information onto the optical card 5. Upon reproduction of information, a light beam for reproduction is irradiated onto the optical card 5 from the light beam irradiation optical system 13. The reflected light from the card surface is detected by the photodetector 14, and signal processes such as demodulation and the like are executed in the modulation-demodulation circuit 10 by using the output signal from the photodetector 14. The recorded data is reproduced to original data.

Figure 1:
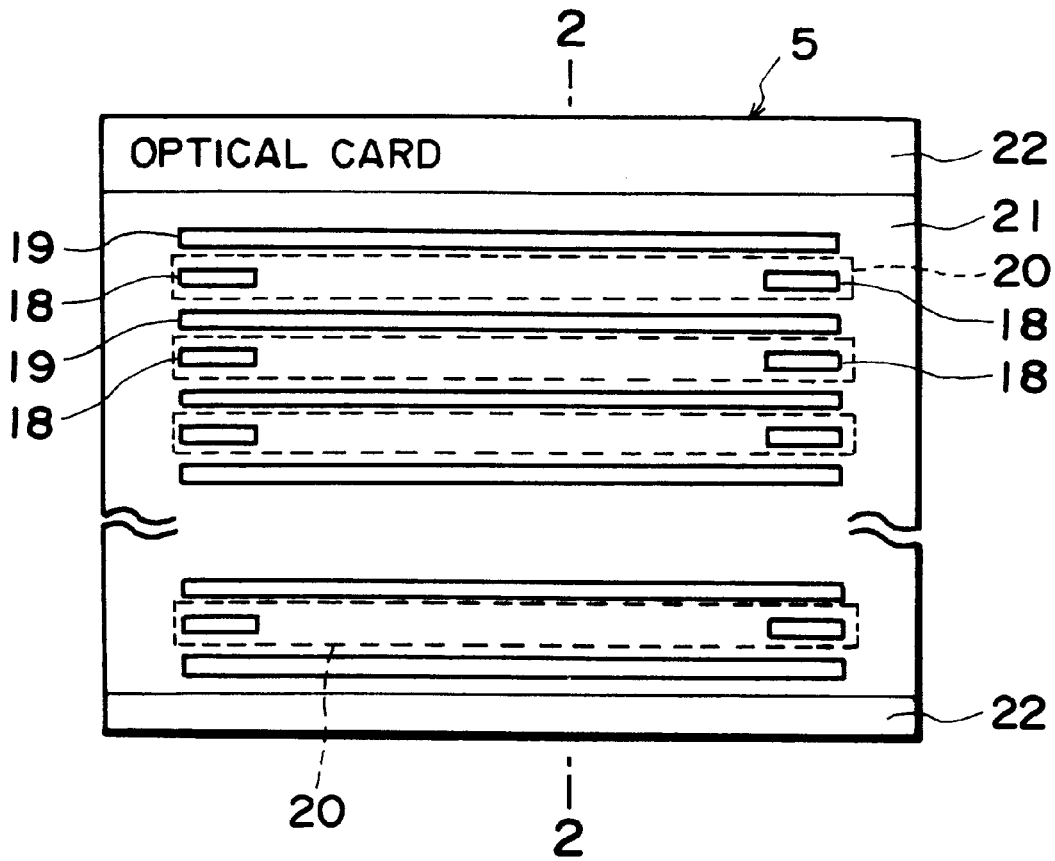
FIG. 1 is a plan view showing a conventional optical card.
Figure 2:
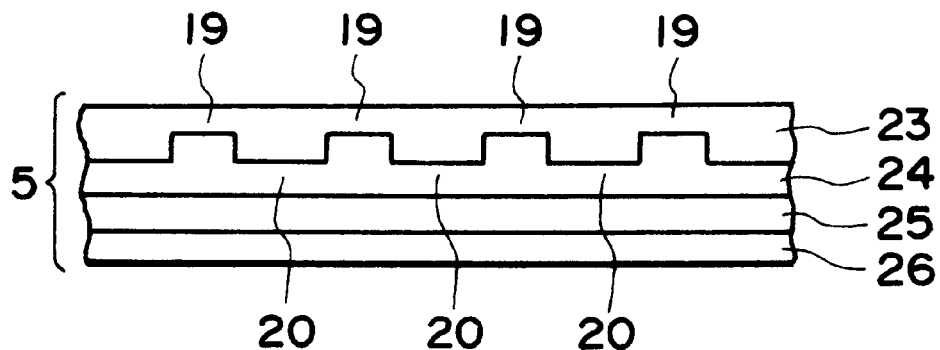
FIG. 2 is a cross sectional view taken along the line 2—2 of the optical card of FIG. 1.
Figure 4:
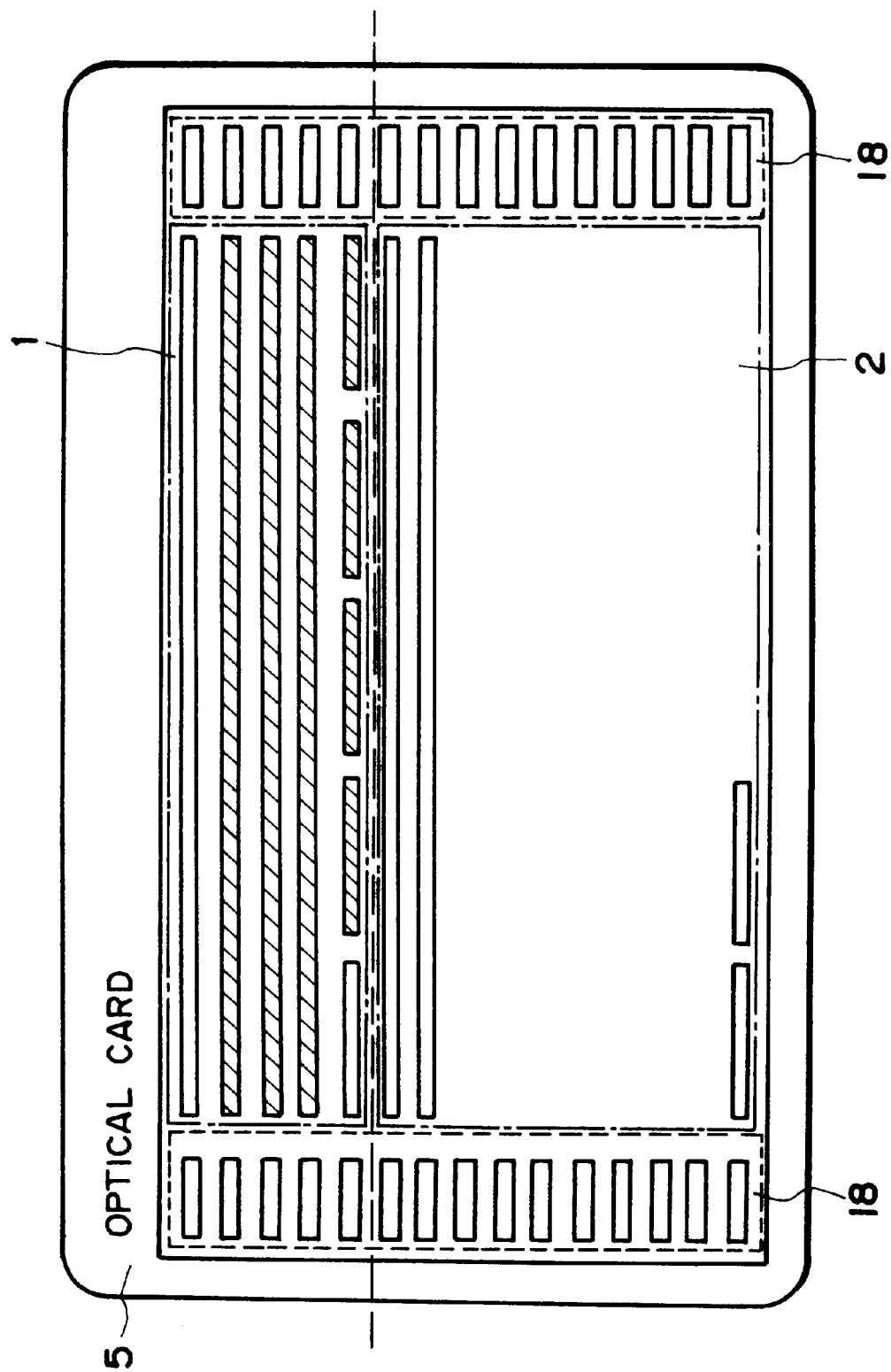
FIG. 4 is a diagram showing the contents of recorded information on an information recording medium according to the invention.

FIG. 4 shows the optical card which is used as an information recording medium in the information recording and reproducing apparatus of FIG. 3. A fundamental construction of the optical card of FIG. 4 is the same as that of the optical card of FIGS. 1 and 2. That is, a plurality of tracks for tracking are formed in an information recording region at regular intervals and an information track to record information is provided between the tracks for tracking. The track numbers 18 used to identify the information tracks are preformatted at both ends of each information track.

Further, in the embodiment, the information recording region of the optical card 5 is divided into two partitions of a partition 1 and a partition 2. In the embodiment, security information regarding the card owner, namely, fingerprint information, is recorded in the partition 1 and entering and leaving times of the card owner to/from a specific district are recorded in the partition 2. That is, in the embodiment, the optical card 5 is used as a personal identification card to confirm the user as himself by the fingerprint information. In case of entering or leaving to/from the special district (for example, in a company, a room where entry is permitted for only given persons, or the like), the fingerprint information recorded in the partition 1 and the fingerprint of the user himself are compared or verified, thereby confirming the user as himself. By recording entering and leaving times into the partition 2, the optical card 5 can be also used as a time card.

Figure 5:
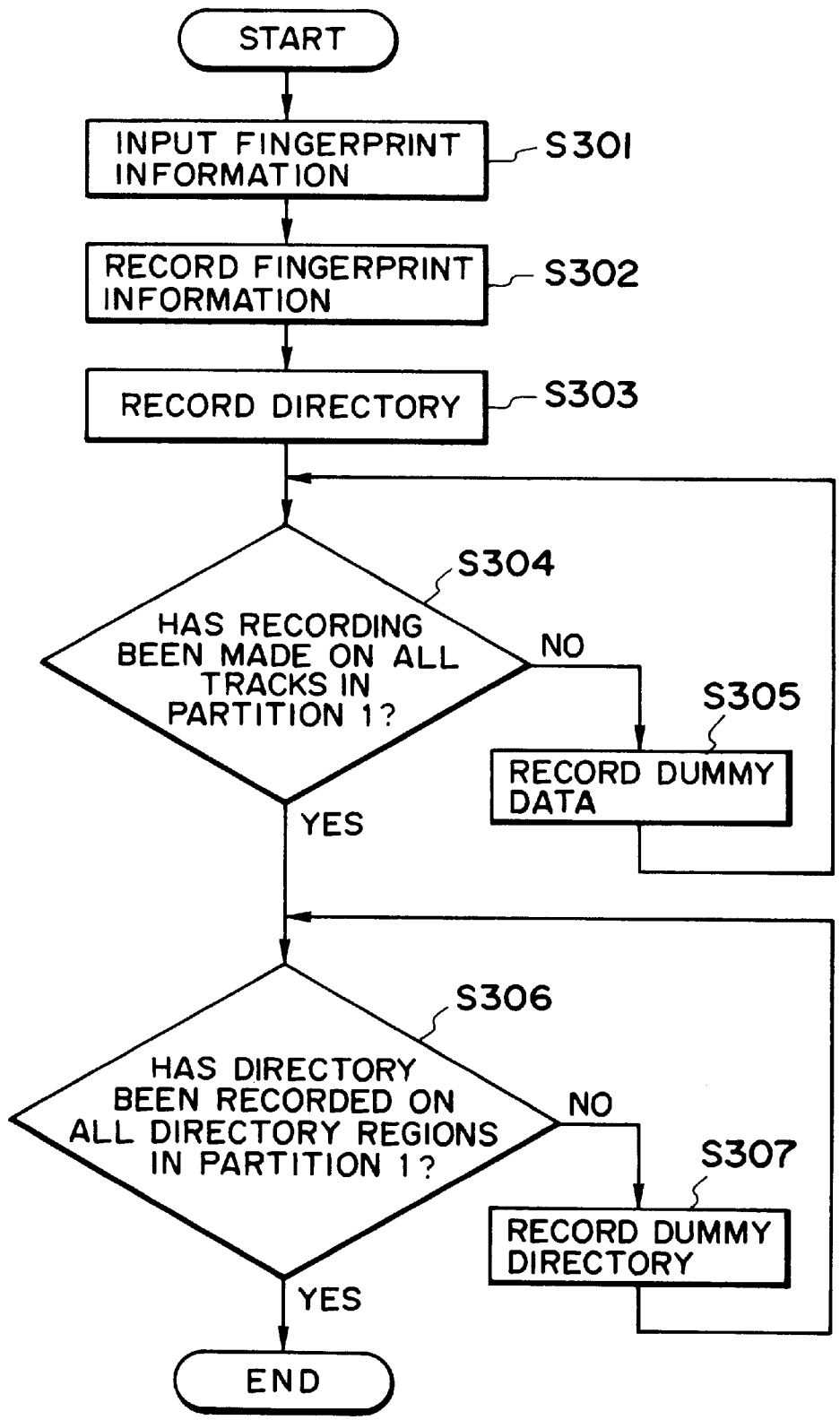
FIG. 5 is a flow chart for explaining an example of an information recording method according to the invention.

A method of recording fingerprint information to the optical card 5 of FIG. 4 will now be described with reference to FIG. 5. In this embodiment, it is assumed that the fingerprint information is recorded when the optical card is issued. In FIG. 5, first, the fingerprint information is read out by a fingerprint scanner (not shown) and read into the host computer 7. However, in FIG. 5, this reading step is omitted and it is assumed that the fingerprint information has already been read into the host computer 7. It is also assumed that the optical card 5 has already been set in the drive 6. In a case of recording the fingerprint information, a recording command is issued from the host computer 7 in FIG. 3 to the drive 6 and the fingerprint information to be recorded is transmitted to the drive 6 (S301). When the fingerprint information is received, the MPU 8 controls each section and allows the fingerprint information to be recorded into the partition 1 of the optical card 5 (S302).

As recording regions to record the fingerprint information, five information tracks are assured in the partition 1 of the optical card 5 as shown in FIG. 4. Among them, four information tracks are provided as data regions to record data and one remaining information track is provided as a directory region to record a directory. The information track in the directory region is divided into five sectors. In step S302, the MPU 8 controls each section and allows the fingerprint information to be recorded to the head track of the partition 1. The other three tracks remain as unrecording tracks.

When the fingerprint information is recorded, the host computer 7 executes a verifying process for controlling the drive 6, reproducing the recorded information, and confirming whether the fingerprint information can correctly be recorded or not. When the fingerprint information can be correctly recorded as a result of the verifying process, the host computer 7 issues a recording command to the drive 6 and records the directory to manage the fingerprint information to the optical card 5 (S303). As a result of the verifying process, if the fingerprint information has not been correctly recorded, the rerecording operation is sequentially performed until the same fingerprint information can be correctly recorded to the next track. Explanation will now be further made on the assumption that the fingerprint information could be correctly recorded.

In step S303, the directory to manage the fingerprint information is recorded in the head sector of the directory region of the partition 1 as shown in the diagram and the other four sectors remain as unrecording sectors. After the directory was recorded, the host computer 7 executes a verifying process for controlling the drive 6, reproducing the directory, and confirming whether the directory has been correctly recorded or not. When it is confirmed that the directory was correctly recorded by the verifying process, step S304 follows. When the directory has not been correctly recorded, the rerecording operation is sequentially executed until the same directory can be correctly recorded in the next sector. Explanation will be further made on the assumption that the directory was normally recorded.

When the recording of the directory is finished, the host computer 7 controls the drive 6 and discriminates whether the information has been recorded in all of the information tracks of the data region of the partition 1 or not (S304). When the information is not recorded in all of the information tracks in the partition 1, dummy data is recorded in the unrecording tracks in the partition 1 (S305). In this case, since three information tracks remain as unrecording tracks in the data region in the partition 1 as mentioned above, the host computer 7 issues a recording command to the drive 6 and allows dummy data to be recorded into the unrecording tracks. The track shown by a hatched portion in FIG. 4 indicates the track in which the dummy data was recorded.

Any data can be fundamentally used as dummy data so long as it can be discriminated. It is not always necessary to have a correlation between the dummy data and predetermined data (security information) recorded in the partition. For example, in the embodiment, continuous data of "0" is recorded in all of the unrecording region in the partition 1. Continuous data of "1" or continuous data of a specific character or data may be also recorded. For example, it is also possible to record a special character train such as "Dummy Data" or the like or a periodic repetition of special data such as "0101", "1010", or "1110110". With such a construction, it is possible to easily know that the data is dummy data. Further, it is also possible to repetitively record at least a part of the specific data recorded in the partition like fingerprint information in the embodiment (or all of the specific data can be also recorded). By using such a construction, when it becomes impossible to reproduce the specific data recorded in the partition, the lost data can be reconstructed by reproducing the dummy data by a special apparatus.

When discriminating in step S304 whether the information has been recorded in all of the tracks of the partition 1 or not, the MPU 8 controls each section, thereby allowing the light beam for reproduction to be scanned to all of the information tracks of the partition 1 from the light beam irradiation optical system 13. Whether there is an unrecording region where no information is recorded is discriminated by the MPU 8 on the basis of an output signal of the photodetector 14.

As mentioned above, when the dummy data is recorded and it is determined that the dummy data has been recorded in all remaining tracks of the partition 1 in step S304, the host computer 7 discriminates whether any directory has been recorded in the whole directory region in the partition 1 (S306). In this case, as mentioned above, since four sectors remain as unrecording sectors in the directory region in the partition 1, the host computer 7 similarly controls the drive 6, thereby allowing dummy data to be recorded into the unrecording sectors (S307). Four sectors shown by hatched regions in FIG. 4 indicate the sectors where the dummy data has been recorded. When it is determined by the host computer 7 that the data was recorded in all of the tracks of the directory region in step S306, the recording process of the fingerprint information is finished.

In the embodiment, after the fingerprint information was recorded in the partition of the optical card 5 as described above, the dummy data is recorded into all of the unrecording regions of the partition. Therefore, even if data is after-recorded into the partition, since there is no unoccupied region in the partition, it can be prevented that the data is after-recorded into the partition. Thus, even if some person tries to illegally alter the data by after-recording new data into the partition, since the after-recording itself of the data cannot be performed, the alteration of the data can be certainly prevented. The security of the recorded data of the optical card can be remarkably improved.

A method of confirming the user as himself by using the optical card on which the fingerprint information has been recorded as mentioned above will now be described with reference to a flowchart of FIG. 6. First, it is assumed that the optical card 5 is used as a personal identification card to confirm the user as himself and the drive 6 in FIG. 3 and a fingerprint scanner (not shown) to read the fingerprint are installed at the entrance/exit of a company. It is also assumed that the fingerprint of the card owner has already been read by the fingerprint scanner and read into the host computer 7 and the optical card 5 has been inserted in the drive 6. Further, it is assumed that the processes in FIG. 6 are executed by an entering/leaving managing application on the MPU 8 in FIG. 3.

Figure 6:
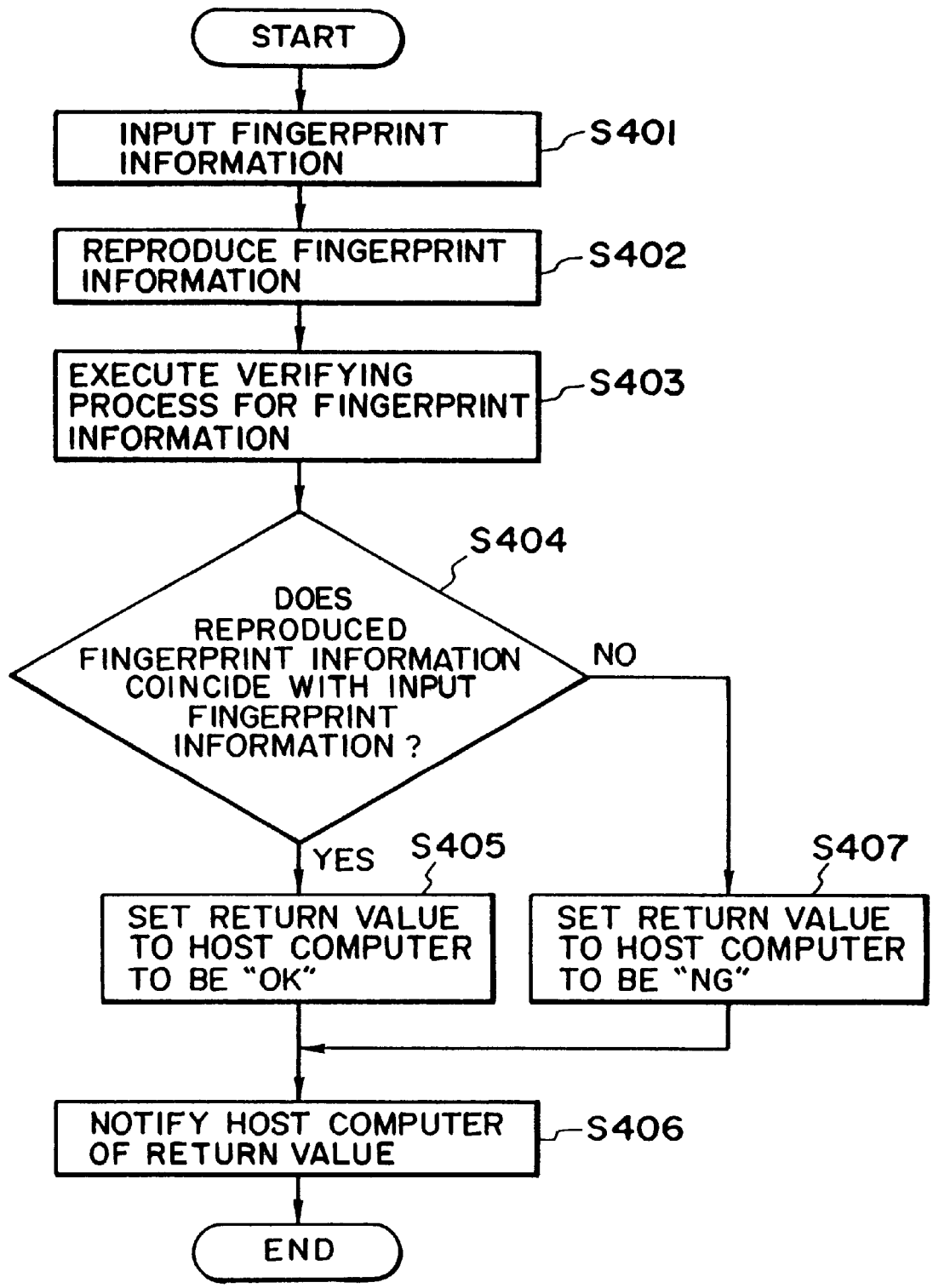
FIG. 6 is a flowchart for explaining a method of confirming the user himself by using a recording medium on which information was recorded by the recording method of FIG. 5.

In FIG. 6, the MPU 8 first inputs the fingerprint information from the host computer 7 (S401). After that, the MPU 8 controls each section and reproduces the fingerprint information recorded in the partition 1 of the optical card 5 (S402). When the fingerprint information is reproduced, the MPU 8 verifies the fingerprint information from the host computer 7 with the fingerprint information reproduced from the optical card 5 (S403). The MPU 8 subsequently discriminates whether the two fingerprints coincide or not (S404) on the basis of a result of the fingerprint verifying process in step S403.

When the two fingerprints coincides, a return value to the host computer 7 is set to "OK" (S405). The return value is notified to the host computer 7 (S406). When the return value of "OK" is received, the host computer 7 unlocks a door of an exit/entrance and permits the entering into the room. When the fingerprint information coincides, the MPU 8 controls each section and records the entering time into the partition 2 of the optical card 5. In this case, the partition 2 of the optical card 5 in FIG. 4 comprises a data region and a directory region in a manner similar to the partition 1. The entering time is recorded in the data region. The directory to manage it is recorded in the directory region. When the recording is finished, the MPU 8 controls the card feed motor 12, ejects the optical card 5 to the outside of the apparatus, hands the optical card 5 to the owner, and finishes a series of processes.

When the fingerprint information does not coincide in step S404, the MPU 8 sets the return value to "NG" (S407) and notifies the host computer 7 of the return value (S406). In this case, the host computer 7 determines that somebody is trying to illegally enter the room, and inhibits entry to the room by not unlocking the door of the exit/entrance. The time is not recorded to the optical card 5.

In the above embodiment, the fingerprint information is recorded only once and the dummy data is recorded into the remaining regions, thereby eliminating the unrecording region of the partition. The invention, however, is not limited to such a construction but the fingerprint information can be also repeatedly recorded in the partition a plurality of times. In this case, at a time point when the remaining recording regions of the partition are smaller than the recording region of the fingerprint information as much as one fingerprint, the dummy data is recorded in the remaining recording regions of the partition.

Even by recording as mentioned above, since no unoccupied region is left in the partition of the optical card, the alteration of data by the after-recording of data can be similarly prevented. Since the fingerprint information is recorded a plurality of times, for example, even in the case where one fingerprint information causes a recording error due to dust, a scratch, or the like and cannot be reproduced, the other fingerprint information can be read. Therefore, safety of the recorded information of the optical card can be enhanced.

Although the above embodiment has been described with respect to the method of recording the fingerprint information to the optical card and managing the entering and leaving, the invention is not limited to such a method but can be used in various fields. For example, it is also possible to use the invention in a prepaid card system. In this regard an initial money amount could be recorded into a predetermined partition of the card at the time of the card issuing, with dummy data being recorded to the remaining regions of the partition. With this method, illegal alteration of money amount information can be prevented and the money amount information recorded in the prepaid card can be protected.

Further, according to the above embodiment, although the example in which the fingerprint information is recorded as information to confirm the card user as himself has been shown, the information to confirm the user as himself is not limited to the fingerprint information. For example, peculiar information such as a number or the like to identify or authorize the user of the card or the issuer of the card can be recorded or information to authorize the card or system can be also used. Although the embodiment has been described on the assumption that the fingerprint information and the dummy data are recorded when the optical card is issued, as another method, for instance, predetermined information (security information) and the dummy data can be also recorded when the card is manufactured or when the card is personalized.

According to the invention as described above, the predetermined information is recorded into the partition of the information recording medium and dummy data is recorded into all of the remaining regions of the partition, so that it is possible to prevent after-recording to the partition. Therefore, even if somebody tries to after-record new information to the partition and to illegally alter the recorded information, since there is no unoccupied region in the partition, the alteration of the recorded information in the partition can be prevented. The security of the recorded information of the recording medium can be remarkably raised.

What is claimed is:

1. An information recording method of recording information on an information recording medium including at least a single partition, comprising the steps of:
   recording predetermined information to said at least a single partition of said recording medium;
   confirming whether said predetermined information has been normally recorded;
   rerecording when said predetermined information is not normally recorded; and
   after said predetermined information was normally recorded, recording dummy data on remaining regions of said at least a single partition so as to eliminate an occupied region in said at least a single partition.

2. A method according to claim 1, wherein said recording medium is an optical card.

3. A method according to claim 1, wherein said predetermined information is user peculiar information to identify or authorize a user of said recording medium, information to identify or authorize an issuer of said recording medium, information to authorize a system, information to authorize said recording medium, or an initial usable money amount of a card in a prepaid card system.

4. A method according to claim 3, wherein said user peculiar information is biometric information of the user.

5. A method according to claim 1, wherein said dummy data is the same as at least a part of the predetermined information recorded in said partition.

6. A method according to claim 1, wherein said dummy data is a specific character train or a periodic repetition of data.

7. A method according to claim 1, wherein said dummy data is a specific character or continuation of data.

8. A method according to claim 1, wherein said predetermined information and dummy data are recorded when said recording medium is manufactured, when said recording medium is issued, or when said recording medium is personalized.

9. An information recording apparatus for recording information on an information recording medium including at least a single partition, comprising:
   means for recording predetermined information on said at least a single partition of said recording medium; and
   means for confirming whether said predetermined information has been normally recorded,
   wherein when said predetermined information is not normally recorded, a rerecording is performed and after said predetermined information was normally recorded, dummy data to eliminate an occupied region in said at least a single partition is recorded on remaining regions in said at least a single partition by said recording means.

10. An apparatus according to claim 9, wherein said recording medium is an optical card.

11. An apparatus according to claim 9, wherein said predetermined information is user peculiar information to identify or authorize a user of said recording medium, information to identify or authorize an issuer of said recording medium, information to authorize a system, information to authorize said recording medium, or an initial usable money amount of a card in a prepaid card system.

12. An apparatus according to claim 11, wherein said user peculiar information is biometric information of the user.

13. An apparatus according to claim 9, wherein said dummy data is the same as at least a part of the predetermined information recorded in said partition.

14. An apparatus according to claim 9, wherein said dummy data is a specific character train or a periodic repetition of data.

15. An apparatus according to claim 9, wherein said dummy data is a specific character or continuation of data.

16. An apparatus according to claim 9, wherein said predetermined information and dummy data are recorded when said recording medium is manufactured, when said recording medium is issued, or when said recording medium is personalized.

* * * * *

UNITED STATES PATENT AND TRADEMARK OFFICE
CERTIFICATE OF CORRECTION

PATENT NO. : 6,056,197
DATED : May 2, 2000
INVENTOR(S) : HIROSHI HARA, ET AL.

It is certified that error appears in the above-identified patent and that said Letters Patent is hereby corrected as shown below:

Column 1

Line 31, "cross sectional" should read --cross-sectional--.

Column 5

Line 67, "partitions of" should read --partitions, namely,--

Column 8

Line 33, "coincides," should read --coincide,--.

Signed and Sealed this

Seventeenth Day of April, 2001

Attest:

NICHOLAS P. GODICI

Attesting Officer   Acting Director of the United States Patent and Trademark Office